United States Patent
Nishida et al.

(10) Patent No.: US 9,593,017 B2
(45) Date of Patent: Mar. 14, 2017

(54) METHOD FOR PRODUCING DIFLUOROPHOSPHATE

(75) Inventors: Tetsuo Nishida, Osaka (JP); Kazuhiko Shogami, Osaka (JP); Tomoya Satoh, Osaka (JP)

(73) Assignee: STELLA CHEMIFA CORPORATION, Osaka (JP)

( * ) Notice: Subject to any disclaimer, the term of this patent is extended or adjusted under 35 U.S.C. 154(b) by 11 days.

(21) Appl. No.: 14/384,816

(22) PCT Filed: Mar. 14, 2012

(86) PCT No.: PCT/JP2012/057408
§ 371 (c)(1),
(2), (4) Date: Sep. 12, 2014

(87) PCT Pub. No.: WO2013/136533
PCT Pub. Date: Sep. 19, 2013

(65) Prior Publication Data
US 2015/0064091 A1  Mar. 5, 2015

(51) Int. Cl.
*C01B 25/455* (2006.01)
*H01M 10/0568* (2010.01)
*H01M 10/0566* (2010.01)
*H01M 10/052* (2010.01)

(52) U.S. Cl.
CPC ......... *C01B 25/455* (2013.01); *H01M 10/052* (2013.01); *H01M 10/0566* (2013.01); *H01M 10/0568* (2013.01); H01M 2300/0045 (2013.01); Y02E 60/122 (2013.01); Y02P 70/54 (2015.11)

(58) Field of Classification Search
CPC ... C01B 25/455; C01D 13/00; H01M 10/0561
USPC .......................................... 423/301; 429/199
See application file for complete search history.

(56) References Cited

U.S. PATENT DOCUMENTS

2011/0111288 A1* 5/2011 Nishida et al. .............. 429/199

FOREIGN PATENT DOCUMENTS

| DE | 813 848 | 9/1951 |
|---|---|---|
| EP | 1 905 739 | 4/2008 |
| EP | 2 065 339 | 6/2009 |
| EP | 2 354 089 | 8/2011 |
| JP | 11-67270 | 3/1999 |
| JP | 2005-53727 | 3/2005 |
| JP | 2005-219994 | 8/2005 |
| JP | 2005-306619 | 11/2005 |
| JP | 2006-143572 | 6/2006 |
| JP | 2010-155773 | 7/2010 |
| JP | 2011-132072 | 7/2011 |
| JP | 2012-051752 | 3/2012 |
| WO | WO 2010064637 A1 * | 6/2010 |
| WO | 2012/004187 | 1/2012 |

OTHER PUBLICATIONS

Extended European Search Report issued Feb. 26, 2015 in European Application No. 12871541.4.
International Search Report issued Jun. 26, 2012 in International (PCT) Application No. PCT/JP2012/057408.
K. Matsumoto et al., "A New Series of Ionic Liquids based on the Difluorophosphate Anion", Inorganic Chemistry, vol. 48, pp. 7350-7358, 2009.
R. C. Thompson et al., "Preparation and Infrared Spectra of Alkali Metal Difluorophosphates", Inorganic Nuclear Chemistry Letters, vol. 5, pp. 581-585, 1969.
The Japan Society for Analytical Chemistry, 43th Annual Meeting, Lecture Summary, No. IP18, p. 536, 1994.
K. Matsumoto et al., "Properties of $PO_2F_2$-based Ionic Liquids as Electrolytes for Electric Double Layer Capacitors", The Electrochemical Society of Japan, Preliminary Report, 1I18, p. 268, before 2004 with concise explanations of pertinent parts.
W. Lange, Ber. Dtsch. Chem., Ges. B26, pp. 786-792, Jan. 1929 with concise explanations of pertinent parts.
Zh. Neorgan. Khim., 7, pp. 1313-1316, 1962 with concise explanations of pertinent parts.
P. Vast et al., "Etude Methodologique de la Synthese des Difluorodioxophosphates Metalliques a Partir de L'Oxyde du Difluorure de Phosphoryle", Journal of Fluorine Chemistry, vol. 38, pp. 297-302, 1988 with concise explanations of pertinent parts.

* cited by examiner

*Primary Examiner* — Wayne Langel
(74) *Attorney, Agent, or Firm* — Wenderoth, Lind & Ponack, L.L.P.

(57) ABSTRACT

A process for preparing difluorophosphate comprising reacting difluorophosphoric acid with at least one salt, as a raw material, selected from a halide salt, a carbonate, a phosphate, a hydroxide and an oxide of an alkali metal, an alkaline earth metal or an onium in the difluoraphosphoric acid, then separating a precipitate from the difluorophosphoric acid by solid-liquid separation, the precipitate being precipitated by crystallization operation in the difluorophosphoric acid, and removing the difluorophosphoric acid contained in the precipitate by distillation to obtain difluorophosphate.

6 Claims, No Drawings

METHOD FOR PRODUCING DIFLUOROPHOSPHATE

TECHNICAL FIELD

The present invention relates to a process for preparing a difluorophosphate.

BACKGROUND ART

In recent years, a salt having a melting point at near roan temperature or a salt having a melting point, less than room temperature (ionic liquid) is found. The ionic liquid is comprised of a cation and an anion, and exists as a liquid state even at room temperature because a bonding strength is very weak. When the structures of a cation and an anion are designed as a bonding strength become poor, it is possible to vary a melting point of the salt and obtain an ionic liquid. Furthermore, it is said that the properties of an ionic liquid can be controlled intentionally by varying a combination of a cation and an anion, or introducing a substituent into each ion.

Ionic liquids are hard to volatilize and have the characteristic that they exist stably to high temperatures more than several hundred degrees centigrade. Ionic liquids differ from so-called "liquid" such, as water or organic solvent in characteristics and are called "third liquid". Use of the ionic liquids as a lubricant or application to a reaction solvent or extraction separation medium are investigated employing hard volatilization and excellent thermal stability of the liquids. In addition, the ionic liquid is salt and has ionic conductivity because it is comprised only of ions. Therefore, it is possible to use ionic liquid itself as an electrolytic solution. Investigation is actively conducted for using an ionic liquid as an electrolytic solution of a battery or a capacitor, or as a plating bath. Conventionally an aqueous electrolytic solution or an organic electrolytic solution has been used for an electrolytic solution of a battery and a capacitor, the aqueous electrolytic solution will foe restricted in water decomposition voltage, and the organic electrolytic solution encounters to a problem in heat resistance and safety. Ionic liquid are preferable in view of safety because they are incombustible and nonvolatile, and are also high in electrochemical stability, they are suitable as an electrolytic solution of an electric double layer capacitor or a battery to use under particularly high temperature environment.

Ionic liquids composed of various cations and anions are investigated in order to apply ion liquids as an electrolytic solution of a battery and a capacitor. Recently, the characteristic of an ionic liquid which is 1-ethyl-3-methylimidazolium difluorophosphate having difluorophosphate as an anion was reported (Non-patent Literature 1). It is disclosed that 1-ethyl-3-methylimidazolium difluorophosphate is equal in electrical conductivity and voltage resistance to 1-ethyl-3-methylimidazolium tetrafluoroborate which is known as a representative ionic liquid, and is reported that it is suitable as an electrolytic solution of an electric double layer capacitor (Non-patent Literature 2).

In Non-patent Literature 1, 1-ethyl-3-methylimidazolium chloride is reacted, with potassium difluorophosphate in acetone, potassium chloride which is a by-product is removed by filtration, the resulting acetone solution is passed through an alumina column, and acetone is distilled off to obtain 1-ethyl-3-methylimidazolium difluorophosphate. Performance of a battery or a capacitor is remarkably influenced by impurities in an electrolytic solution, and thus it is desirable to reduce impurities as low as possible when an ionic liquid is used as an electrolytic solution. Ionic liquids are hardly volatile and are liquid state in a wide temperature range. It is difficult to reduce impurities in the ionic liquid by purification such, as distillation or recrystallization. Therefore, it is necessary to use a starting material having high purity in order to prepare an ionic liquid having high purity. Potassium difluorophosphate used in Non-patent literature 1 is desirable to contain impurities as low as possible.

Processes for preparing difluorophosphoric acid salt are disclosed, for example, in Patent Literatures 1 to 5 and Non-patent Literatures 3 to 7.

In Patent Literature 1, a process is disclosed for preparing potassium difluorophosphate by mixing and melting potassium hexafluorophosphate and potassium metaphosphate. However, this process is not deemed an excellent process in view of product purity and productivity because of contamination of impurities from a melting pot and high-temperature environment of 700° C.

Patent Literatures 2 to 5 disclose processes for preparing lithium difluorophosphate by reacting lithium hexafluorophosphate or phosphorus pentafluoride with any of lithium metaphosphate, silicon dioxide or lithium carbonate in an organic electrolytic solution. However, these reactions require 40 to 170 hours for obtaining difluorophosphoric acid salt and are not suitable for industrial production.

Non-patent Literature 3 or 4 discloses a process for preparing difluorophosphoric acid salt by reacting diphosphorus pentaoxide with ammonium fluoride or acid sodium fluoride. However, these processes produce a lot of monofluophosphate, phosphate and water as by-products, require severe purification process and are not, effective methods. Non-patent Literature 5 discloses a process for preparing difluorophosphoric acid salt by reacting $P_2O_3F_4$ (difluorophosphoric acid anhydride) with oxide or hydroxide such as $Li_2O$ or LiOH. However, difluorophosphoric acid anhydride used herein is very expensive and high-purity one is hardly available, and thus this process is unfavorable for industrial production.

Non-patent Literature 6 discloses a process for preparing difluorophosphoric acid salt by reacting alkali metal chloride with excess of difluorophosphoric acid and removing hydrogen chloride (by-product) and unreached difluorophosphoric acid by drying with heat at a reduced pressure. However, it is difficult to obtain difluorophosphoric acid salt having high purity even if starting difluorophosphoric acid having high purity is used, since a lot of monofluorophosphoric acid salt or fluoride salt remains as impurities in the desired difluorophosphoric acid salt.

Non-patent Literature 7 discloses a process for preparing potassium difluorophosphate by melting and reacting potassium dihydrogenphosphate and ammonium fluoride. The reaction temperature is about 170° C. and is mild compared with the reaction condition of patent Literature 1, hence easy to practice industrially. However, it is not effective in view of treatment of a large quantity of by-produced ammonia gas and remaining of a large quantity of ammonium fluoride. Thus, there is problem in the purity of the final product.

Further, difluorophosphoric acid salt having high purity is usable not only as a starting material for an ionic liquid but as an additive for an electrolytic solution of a lithium secondary battery. In recent years, in the application field of the lithium secondary battery, a further technological advance is seen in the improvement of output density and the energy density, and the restriction of capacity loss with use expansion of the electronic equipment such as a mobile phone, personal computer, digital camera to one in-vehicle use. Particularly, since the products in-vehicle use might be exposed to the environment that is snore severe than those of consumer products use, high reliability is required in a life cycle and storage characteristics of the products. A non-aqueous electrolytic solution in which a lithium salt is dissolved in an organic solvent, is used as an electrolytic solution fox a lithium secondary battery. Because the non-aqueous electrolytic solution decomposes and causes extraordinary reaction to influence on the performance of the lithium secondary battery, it is attempted to improve life cycle and storage characteristics of the battery by adding various additives to the non-aqueous electrolytic solution. Patent Literature 6 discloses it is possible to form a film on a positive electrode and a negative electrode by using a non-aqueous electrolytic solution containing as an additive at least one of lithium monofluorophosphate and lithium difluorophosphate and to suppress decomposition of the electrolytic solution caused, by the contact of the non-aqueous electrolytic solution and a positive electrode active material and negative electrode active material. As a result, it is possible to suppress the self discharge and enhance storage characteristics.

PRIOR ART

Patent Literature

Patent Literature 1: DE-813843
Patent Literature 2: JP 2005-53727 A
Patent Literature 3: JP 2005-219994 A
Patent Literature 4: JP 2005-306619 A
Patent Literature 5: JP 2006-143572 A
Patent Literature 6: JP Patent No. 3439085

Non-Patent Literature

Non-patent Literature 1: K. Matsumoto and R, Hagiwara, Inorganic Chemistry, 2009, 48, 7350-7358
Non-patent Literature 2: No. 77, The Electrochemical Society of Japan, Preliminary report, 1I18
Non-patent Literature 3: Ber. Dtsch. Chem., Ges. B26 (1929) 766
Non-patent Literature 4: Zh. Neorgan. Khim., 7 (1962) 1313
Non-patent Literature 5: Journal of Fluorine Chemistry, 38 (1938) 297-302
Non-patent Literature 6: Inorganic Nuclear Chemistry Letters, vol. 5 (1969) 581-585
Non-patent Literature 7; The Japan Society for Analytical Chemistry, 43th annual Meeting, Lecture summary, 536 (1994)

SUMMARY OF THE INVENTION

Problem to be Solved by the Invention

An object of the present invention is to provide a process for preparing a difluorophosphoric acid salt having high purity which is usable as a starting material for preparing an ionic liquid and as an additive for an electrolytic solution of a lithium secondary battery.

Means for Solving the Problem

The present invention provides the following.
1. A process for preparing difluorophosphate comprising reacting difluorophosphoric acid with at least one salt, as a raw material, selected from a halide salt, a carbonate, a phosphate, a hydroxide and an oxide of an alkali metal, an alkaline earth metal or an onium in the difluoraphosphoric acid, then separating a precipitate from the difluorophosphoric acid by solid-liquid separation, the precipitate being precipitated by crystallization operation in the difluorophosphoric acid, and removing the difluorophosphoric acid contained in the precipitate by distillation to obtain difluorophosphate.
2. A process for preparing difluorophosphate wherein a starting salt is at least one selected from a halide, a carbonate, a phosphate, a hydroxide and an oxide of an alkali metal.
3. A process for preparing difluorophosphate wherein the alkali metal is at least one selected from lithium, sodium and potassium.
4. A process for preparing difluorophosphate wherein a starting salt is or a starting salt and difluorophosphoric acid are added to the difluorophosphoric acid solution obtained by solid-liquid separation after crystallization operation, and then the operation in the above item 1 is repeated.

The present process is characterized in that the starting salt and difluorophosphoric acid are reacted in the difluorophosphoric acid, and the crystal is precipitated from the difluorophosphoric acid solution having the formed difluorophosphate dissolved therein by crystallization operation.

As mentioned above, in the conventional processes of difluorophosphate, it was impossible to obtain difluorophosphate having high purity due to an undesired formation of a fluoride, monofluorophosphate or phosphate. Usually, when insufficient in purity, purity can be enhanced by recrystallization. For recrystallization, a solvent is required which suitably dissolves a product and does not react with the product. The present inventors have carefully investigated organic and inorganic solvents usually used, but could not find a crystallization solvent which is suitable for crystallization of difluorophosphate. In non-patent literature 4, alkali metal chloride is reacted with difluorophosphoric acid to form difluorophosphate, which is washed with ether and then recrystallized in dehydrated alcohol for purification. When we have tried re-crystallization of difluorophosphate in alcohol, we confirmed formation of impurity ion by ion chromatography. The structure of the impurity ion is not clear, it is assumed to be formed by the reaction of difluorophosphoric acid ion and alcohol.

After repeated trial and error, we found difluorophosphoric acid is suitable for crystallization solvent of difluorophosphate, and made possible to prepare difluorophosphate having high purity easily by using difluorophosphoric acid as both of reaction solvent and crystallization solvent.

Effect of the Invention

According to the present process, it is possible to industrially prepare difluorophosphate having high purity easily. Particularly, difluorophosphate is extremely useful as a raw material for ionic liquid or an additive for electrolytic solution of lithium secondary cell. Thus, difluorophosphate produced by the present invention is highly valuable to use.

EMBODIMENT OF CARRYING OUT THE INVENTION

A detailed description will be given of the embodiment of the invention, but is not limited to the following contents and is modified suitably within the scope of the invention.

The present process is characterized in that
(1) at least one salt, as a raw material, selected from a halide salt, a carbonate, a phosphate, a hydroxide and an oxide of an alkali metal, an alkaline earth metal or an onium, is reacted with
(2) difluorophosphoric acid,
(3) in the difluorophosphoric acid,
(4) separating a precipitate from the difluorophosphoric acid by solid liquid separation, the precipitate being precipitated by crystallization operation in the difluorophosphoric acid,
(5) and removing the difluorophosphoric acid contained in the precipitate by distillation to obtain difluorophosphate.

The precipitate precipitated by the above crystallization operation contains difluorophosphoric acid and impurities in addition to the desired difluorophosphate.

Examples of the above salts, as a raw material, are halide salt, carbonate, phosphate, hydroxide and oxide of an alkali metal, an alkaline earth metal or an onium. At least one of these can be used.

Examples of the above alkali metals are Li, Na, K, Rb and Cs. Among them, preferable are Li, Na, K in view of cost and availability.

Examples of the above alkaline earth metals are Be, Mg, Ca, Sr, Ba and Al. Among them, preferable are Mg, Ca, Ba and Al in view of cost and safety.

Examples of the above oniums are ammonium, phosphonium and sulfonium.

Examples of ammoniums are $NH_4+$, secondary ammonium, tertiary ammonium and quaternary ammonium. Examples of quaternary ammoniums usable in the present invention are tetraalkyl ammonium, imidaxolium, pyrazolium, pyridinium, triazolium, pyridazinium, thiazolium, oxazolium, pyrimidinium and pyrazinium, but is not limited to these examples.

Example of phosphoniums usable in the present invention is tetraalkyl phosphonium.

Example of sulfoniums usable in the present invention is trialkyl sulfonium.

Examples of halide salts as a raw material are fluoride, chloride, bromide and iodide. Among them, preferable are fluoride and chloride in view of molecular weight.

Examples of phosphates as a raw material are orthophosphate, monohydrogenphosphate, dihydrogenphosphate, metaphosphate, monohydrogenmetaphosphate, dihydrogenmetaphosphate, phosphinate, metaphosphinate and monofluorophosphate. Among them, preferable are orthophosphate and dihydrogenphosphate in view of cost and availability.

In the present invention, halide, carbonate, phosphate, hydroxide and oxide are usable singly or in at least two of them.

Regarding the ratio of the starting salt and difluorophosphoric acid, the starting salt and difluorophosphoric acid are mixed and reacted in mole amounts which corresponds to saturated solubility of difluorophosphate in difluorophosphoric acid. It is preferable to use 0.01 to one mole, more preferably 0.03 to 0.5 mole, and particularly preferably 0.05 to 0.3 mole of the starting salt per mole of difluorophosphoric acid.

In the process for preparing difluorophosphate of the present invention, the reaction of the starting salt and difluorophosphoric acid is conducted at preferably −50 to 110° C., more preferably at 0 to 80° C., particularly preferably at 0 to 40° C. The reaction time is 0.5 to 40 hours, preferably 1 to 20 hours.

In the process for preparing difluorophosphate of the present invention, the temperature of crystalline out the difluorophosphate from difluorophosphoric acid solution wherein difluorophosphate is dissolved in difluorophosphoric acid by crystallization operation is preferably −100 to 100° C., more preferably −80 to 80° C., particularly preferably −50 to 50° C.

In the process for preparing difluorophosphate of the present invention, the crystals precipitated from crystallization operation contain difluorophosphoric acid used as crystallization solvent and impurities by-produced. It is necessary to remove these impurities by drying operation. The drying temperature is preferably 0 to 100° C., more preferably 0 to 80° C., particularly preferably 0 to 60° C.

It is preferable to conduct the drying in an inert gas such as nitrogen and argon or in stream of these gases. Although performed at ordinary pressure or under reduced pressure, the drying is preferably conducted under reduced pressure to promote removal of volatiles.

In the process for preparing difluorophosphate of the present invention, an organic solvent can be added to difluorophosphoric acid solution in order to vary solubility of the difluorophosphate or enhance filtability in the filtration operation. The solvent is not limited insofar as the solvent does not react with the starting salt, difluorophosphoric acid and difluorophosphate, and does not affect operability of the present process. Examples of the solvent are hydrocarbons, ethers, nitriles and carbonates.

As for the purity of difluorophosphoric acid used in the process for preparing difluorophosphate of the present invention, higher one is preferable. The difluorophosphoric acid can be prepared by the conventionally known methods, for example, by the method disclosed on page 536 of J. C. BAILER et. al., COMPREHENSIVE INORGANIC CHEMISTRY vol. 2. Namely, phosphoric anhydride is reacted with three times moles of anhydrous hydrofluoric acid to obtain a mixture of monofluorophosphoric acid and difluorophosphoric acid. The mixture was distilled at, for example, 51° C./100 mmHg to enhance purity of difluorophosphoric acid. As recited in non-patent Literature 4, it is possible to further enhance purity of difluorophosphoric acid by repeated distillation operations. The higher the purity of difluorophosphoric acid used in the process for preparing difluorophosphate is, the higher the purity of difluorophosphate obtained. The content of difluorophosphoric acid is preferably at least 95%, more preferably at least 98%, and especially preferably at least 99% by measured with ion chromatography.

In the process for preparing difluorophosphate of the present invention, it is possible to reuse the difluorophosphoric acid solution having dissolved difluorophosphate therein and obtained by solid-liquid separation after crystallization operation. Namely, the difluorophosphoric acid solution obtained by solid liquid separation becomes low in concentration of difluorophosphoric acid. Therefore, it is possible to prepare difluorophosphate by adding a starting salt or a starting salt and difluorophosphoric acid to the solution to perform the reaction of difluorophosphoric acid and the starting salt, and conducting the similar crystallization and filtration operations.

EXAMPLES

The present invention will be described with reference to the following Examples. The materials or amounts recited in the examples are a simple example and do not limit the scope of the invention unless recited, limitative.

Reference Example 1

Purification of Difluorophosphoric Acid by Distillation

In order to enhance the purity, difluorophosphoric acid was distilled for use as crystallization solvent. To a round-bottom flush made of PTFE was placed 400 g of difluorophosphoric acid (reagent: Fluoxochem Inc.) and distilled at 40° C. under reduced pressure, and 313 g of fraction was obtained in a round-bottom, flask made of PTFE and cooled at −20° C. The fraction was subjected to anion analysis by ion chromatography (Dionex KK, DX-500, column AS-23) and purity of difluorophosphoric acid was measured by area normalization method of difluorophosphoric acid ion. The difluorophosphoric acid was 99% purity in relative area.

Example 1

To a 500 ml vessel sale of PFA was placed 300 g of difluorophosphoric acid obtained by distillation operation in Reference Example 1 and thereto was added 25 g of lithium chloride (reagent: Wako Pure Chemical Industries, Ltd,). The reaction solution is filtered to remove insolubles and the resulting filtrate was cooled from 25° C. to −30° C. to precipitate the crystals. The slurry was subjected to solid-liquid separation to obtain crystals and the crystals was dried at 40° C. under reduced pressure using a round-bottom flask made of PTFE. The obtained crystals of lithium difluorophosphate were subjected to anion analysis by ion chromatography (Dionex KK, DX-500, column AS-23) and purity of lithium difluorophosphate was measured by area normalization method of difluorophosphoric acid ion. The lithium difluorophosphate crystals was 97% purity in relative area.

Example 2

To 215 g of filtrate obtained by solid-liquid separation in crystallization operation of Example 1 was added 2.4 g of lithium chloride (reagent: Wako Pure Chemical Industries, Ltd.). The reaction solution is filtered to remove insolubles and the resulting filtrate was cooled from 25° C. to −30° C. to precipitate the crystals. The slurry was subjected to solid-liquid separation to obtain crystals and the crystals was dried at 40° C. under reduced pressure using a round-bottom flask made of PTFE. The obtained crystals of lithium difluorophosphate were subjected to anion analysis by ion chromatography (Dionex KK, DX-500, column AS-23) and purity of lithium difluorophosphate was measured by area normalization method of difluorophosphoric acid ion. The lithium difluorophosphate crystals was 97% purity in relative area.

Example 3

To a 500 ml vessel made of PFA was placed 300 g of difluorophosphoric acid obtained by distillation operation in Reference Example 1 and thereto was added 22 g of lithium carbonate (reagent: Wako Pure Chemical Industries, Ltd.). The reaction solution is filtered to remove insolubles and the resulting filtrate was cooled from 25° C. to −30° C. to precipitate the crystals. The slurry was subjected to solid-liquid separation to obtain crystals and the crystals was dried at 40° C. under reduced pressure using a round-bottom flask made of PTFE. The obtained crystals of lithium difluorophosphate were subjected to anion analysis by ion chromatography (Dionex KK, DX-500, column AS-23) and purity of lithium difluorophosphate was measured by area normalization method of difluorophosphoric acid ion. The lithium difluorophosphate crystals was 95% purity in relative area.

Example 4

To a 500 ml vessel made of PFA was placed 300 g of difluorophosphoric acid obtained by distillation operation in Reference Example 1 and thereto was added 14 g of lithium hydroxide (reagent: Wako Pure Chemical Industries, Ltd.). The reaction solution is filtered to remove insolubles and the resulting filtrate was cooled from 25° C. to −30° C. to precipitate the crystals. The slurry was subjected to solid-liquid separation to obtain crystals and the crystals was dried at 40° C. under reduced pressure using a round-bottom flask made of PTFE. The obtained crystals of lithium difluorophosphate were subjected to anion analysis by ion chromatography (Dionex KK, DX-500, column AS-23) and purity of lithium difluorophosphate was measured by area normalization method of difluorophosphoric acid ion. The lithium difluorophosphate crystals was 93% purity in relative area.

Example 5

To a 500 ml vessel made of PFA was placed 300 g of difluorophosphoric acid obtained by distillation operation in Reference Example 1 and thereto was added 61 g of sodium bromide (reagent: Wako Pure Chemical Industries, Ltd.). The reaction solution is filtered to remove insolubles and the resulting filtrate was cooled from 25° C. to −30° C. to precipitate the crystals. The slurry was subjected to solid-liquid separation to obtain crystals and the crystals was dried at 40° C. under reduced pressure using a round-bottom flask made of PTFE. The obtained crystals of sodium, difluorophosphate were subjected to anion analysis by ion chromatography (Dionex KK, DX-500, column AS-23) and purity of sodium difluorophosphate was measured by area normalization method of difluorophosphoric acid ion. The sodium difluorophosphate crystals was 94% purity in relative area.

Example 6

To a 500 ml vessel made of PFA was placed 300 g of difluorophosphoric acid obtained by distillation operation in Reference Example 1 and thereto was added 33 g of calcium chloride (reagent: Wako Pure Chemical Industries, Ltd.), The reaction solution is filtered to remove insolubles and the resulting filtrate was cooled from 15° C. to −30° C. to precipitate the crystals. The slurry was subjected to solid-liquid separation to obtain crystals and the crystals was dried at 40° C. under reduced pressure using a round-bottom flask made of FIFE, The obtained crystals of calcium difluorophosphate were subjected to anion analysis by ion chromatography (Dionex KK, DX-500, column AS-23) and purity of calcium difluorophosphate was measured by area normalization method of difluorophosphoric acid ion. The calcium difluorophosphate crystals was 95% purity in relative area.

Comparative Example 1

The experiment was conducted in the same manner as in Example 1 except that the filtrate was not subjected to crystallization but was directly concentrated and dried at 40° C. under reduced pressure using a round-bottom flask made of PTFE. The obtained crystals of lithium difluorophosphate were subjected to anion analysis by ion chromatography (Dionex KK, DX-500, column AS-23) and purity of lithium difluorophosphate was measured by area normalization method of difluorophosphoric acid ion. The lithium difluorophosphate crystals was 85% purity in relative area.

INDUSTRIAL APPLICABILITY

Difluorophosphate produced by the present invention is extremely useful as a raw material for ionic liquid or an additive for electrolytic solution of lithium secondary ceil and is highly valuable to use.

The invention claimed is:

1. A process for preparing difluorophosphate comprising reacting difluorophosphoric acid with at least one starting compound selected from the group consisting of,
   a halide salt, a carbonate, a phosphate, a hydroxide and/or an oxide of an alkali metal,
   a halide salt, a carbonate, a phosphate, a hydroxide and/or an oxide of an alkaline earth metal, and
   a halide salt, a carbonate, a phosphate and/or a hydroxide of an onium, in the difluorophosphoric acid, wherein 0.01 to 1 mole of the starting compound is added per mole of the difluorophosphoric acid, and a content of the difluorophosphoric acid in the reaction is in excess of the starting compound,
   then separating a precipitate from the difluorophosphoric acid by solid-liquid separation, the precipitate being precipitated by a crystallization operation in the difluorophosphoric acid, and
   removing the difluorophosphoric acid contained in the precipitate by distillation to obtain difluorophosphate.

2. The process for preparing difluorophosphate as defined in claim 1, wherein the starting compound is at least one selected from the group consisting of a halide, a carbonate, a phosphate, a hydroxide and an oxide of an alkali metal.

3. The process for preparing difluorophosphate as defined in claim 1, wherein the alkali metal is at least one selected from the group consisting of lithium, sodium and potassium.

4. The process for preparing difluorophosphate as defined in claim 1, further comprising adding at least one compound selected from the group consisting of,
   a halide salt, a carbonate, a phosphate, a hydroxide and/or an oxide of an alkali metal,
   a halide salt, a carbonate, a phosphate, a hydroxide and/or an oxide of an alkaline earth metal, and
   a halide salt, a carbonate, a phosphate, and/or a hydroxide of an onium, or adding difluorophosphoric acid and at least one compound selected from the group consisting of,
   a halide salt, a carbonate, a phosphate, a hydroxide and/or an oxide of an alkali metal,
   a halide salt, a carbonate, a phosphate, a hydroxide and/or an oxide of an alkaline earth metal, and
   a halide salt, a carbonate, a phosphate, and/or a hydroxide of an onium to a difluorophosphoric acid solution resulting from the solid-liquid separation step, then separating a precipitate from the difluorophosphoric acid solution by solid-liquid separation, the precipitate being precipitated by a crystallization operation in the difluorophosphoric acid solution, and removing the difluorophosphoric acid contained in the precipitate by distillation to obtain difluorophosphate.

5. The process for preparing difluorophosphate as defined in claim 2, wherein the alkali metal is at least one selected from the group consisting of lithium, sodium and potassium.

6. The process for preparing difluorophosphate as defined in claim 1, wherein 0.03 to 0.5 mole of the starting compound is added per mole of difluorophosphoric acid.

* * * * *